United States Patent
El Semary

(10) Patent No.: US 11,807,585 B1
(45) Date of Patent: Nov. 7, 2023

(54) FERTILIZER COMPOSITION

(71) Applicant: KING FAISAL UNIVERSITY, Al-Ahsa (SA)

(72) Inventor: Nermin El Semary, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/176,016

(22) Filed: Feb. 28, 2023

(51) Int. Cl.
*C05F 11/00* (2006.01)
*C05G 5/10* (2020.01)
*C05G 3/60* (2020.01)

(52) U.S. Cl.
CPC ............... *C05F 11/00* (2013.01); *C05G 3/60* (2020.02); *C05G 5/10* (2020.02)

(58) Field of Classification Search
None
See application file for complete search history.

(56) References Cited

U.S. PATENT DOCUMENTS

| | | | | |
|---|---|---|---|---|
| 4,666,497 A | * | 5/1987 | Tenzer | C05F 11/08 71/7 |
| 2008/0299235 A1 | | 12/2008 | Aburdeineh et al. | |
| 2019/0246686 A1 | * | 8/2019 | Zhuang | A23G 4/064 |
| 2021/0380498 A1 | | 12/2021 | Sawant | |
| 2022/0281781 A1 | | 9/2022 | Quinn et al. | |

FOREIGN PATENT DOCUMENTS

| | | | | |
|---|---|---|---|---|
| CN | 110483177 A | * | 11/2019 | ............ C05G 3/00 |
| CN | 110615698 A | | 12/2019 | |
| CN | 110655424 A | | 1/2020 | |
| FR | 3040124 A1 | * | 2/2017 | ............ A01N 65/20 |
| WO | WO 2023017455 A1 | * | 2/2023 | ............ C05F 11/00 |

OTHER PUBLICATIONS

Tayyaba Zia et al, "Trigonella foenum-graecum (fenugreek)-mediated suppression of Meloidogyne javanica in mungbean", Acta Agrobotanica (2013), vol. 56, No. 2,.*

Bello, Adewale Suraj, et al. ""Beyond the Source of Bioenergy": Microalgae in Modern Agriculture as a Biostimulant, Biofertilizer, and Anti-Abiotic Stress." Agronomy 11.8 (2021): 1610.

Sabale, A. B., et al. "Effect of seaweed extracts (SWE) on germination of Trigonella foenum-graecum seeds." BIOINFOLET—A Quarterly Journal of Life Sciences 7.2 (2010): 131-132.

* cited by examiner

*Primary Examiner* — Wayne A Langel
(74) *Attorney, Agent, or Firm* — Nath, Goldberg & Meyer; Richard C. Litman

(57) ABSTRACT

The fertilizer composition is an algae-based, biodegradable and compostable fertilizer composition. The fertilizer composition includes an algal biomass, ground fenugreek seeds, and a binder for molding the fertilizer into pellets. In some embodiments, the fertilizer composition includes *Enteromorpha prolifera* (*E. prolifera*), ground and sieved fenugreek seeds and mastic gum. *E. prolifera* contains numerous nutrients, including vitamins, minerals and a variety of bioactive compounds. Fenugreek seeds have antimicrobial and antioxidant activities, and also have natural insect repellant properties. Mastic gum exhibits antimicrobial activity. Thus, the fertilizer composition provides a variety of nutrients to plants and also provides protection against pathogens. In the fertilizer composition, a ratio of the *E. prolifera* to the ground fenugreek seeds to the mastic gum by weight may be 6:3:1.

3 Claims, No Drawings

FERTILIZER COMPOSITION

BACKGROUND

1. Field

The disclosure of the present patent application relates to fertilizers, and particularly to a fertilizer composition that is algae-based, biodegradable, and compostable.

2. Description of the Related Art

Although effective, chemical fertilizers and pesticides tend to reduce the organic and microbial contents of soil, thus making it difficult for plants to uptake nutrients, and further stripping the soil of nutrients, other than the limited nutrients found in the fertilizer. Additionally, such chemical fertilizers and insecticides may cause unintended environmental damage and may also pose health and safety risks to people and animals consuming the plants growing in the soil. Thus, natural replacements for chemical fertilizers and pesticides are desirable, particularly those made from plant matter that is known to be safe, biodegradable, and compostable. Thus, a fertilizer composition solving the aforementioned problems is desired.

SUMMARY

The fertilizer composition is an algae-based, biodegradable, and compostable fertilizer composition. The fertilizer composition includes an algal biomass, ground fenugreek seeds, and a binder for molding the fertilizer into pellets. In some embodiments, the fertilizer composition includes *Enteromorpha prolifera* (*E. prolifera*), ground and sieved fenugreek seeds, and mastic gum. *E. prolifera* contains numerous nutrients, including vitamins, minerals and a variety of bioactive compounds. Fenugreek seeds have antimicrobial and antioxidant activities, and also have natural insect repellant properties. Mastic gum exhibits antimicrobial activity. Thus, the fertilizer composition provides a variety of nutrients to plants and also provides protection against pathogens. In the fertilizer composition, the ratio of the *E. prolifera* to the ground fenugreek seeds to the mastic gum by weight may be 6:3:1.

The fertilizer composition is made by homogenously mixing *E. prolifera*, ground and sieved fenugreek seeds and mastic gum in water to form a first mixture. The first mixture is autoclaved to produce a dry product, and this dry product is homogenously mixed with water to produce the fertilizer composition. The fertilizer composition may be further cast and molded into fertilizer pellets.

These and other features of the present subject matter will become readily apparent upon further review of the following specification.

DETAILED DESCRIPTION OF THE PREFERRED EMBODIMENTS

The fertilizer composition is an algae-based, biodegradable and compostable fertilizer composition. The fertilizer composition includes the green algae *Enteromorpha prolifera* (*E. prolifera*), ground and sieved fenugreek seeds, and mastic gum. *E. prolifera* contains numerous nutrients, including vitamins, minerals and a variety of bioactive compounds. *E. prolifera* helps to add soil nutrients, such as potassium and nitrogen, to enrich soil and compost to benefit the root structure and growth of crops and other plants. Fenugreek seeds have antimicrobial and antioxidant activities, and also have natural insect repellant properties. Mastic gum exhibits antimicrobial activity. Mastic gum is also a resin that may be used as a binder to mold the ingredients into fertilizer pellets for application to soil and compost. Thus, the fertilizer composition provides a variety of nutrients to plants and also provides protection against pathogens. In the fertilizer composition, the ratio of the *E. prolifera* to the ground fenugreek seeds to the mastic gum by weight may be 6:3:1.

In experiments, the fertilizer composition was prepared by homogenously mixing 6 g of *E. prolifera*, 3 g of ground and sieved fenugreek seeds, and 1 g of mastic gum in 75 mL of water to form a first mixture. The first mixture is autoclaved to produce a dry product, and this dry product was homogenously mixed with 25 mL of water to produce the fertilizer composition. The fertilizer composition was then cast and molded into fertilizer pellets.

It is to be understood that the fertilizer composition is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A fertilizer composition, comprising:
    *E. prolifera*;
    ground fenugreek seeds mixed with the *E. prolifera* to form a mixture; and
    mastic gum added to the mixture of *E. prolifera* and the ground fenugreek seeds for molding the mixture into fertilizer pellets, the mixture including a ratio of the *E. prolifera* to the ground fenugreek seeds to the mastic gum by weight of 6:3:1.

2. A method of making a fertilizer composition, comprising the steps of:
    homogenously mixing *E. prolifera*, ground fenugreek seeds and mastic gum in water to form a first mixture;
    autoclaving the first mixture to produce a dry product;
    homogenously mixing the dry product with water to produce a fertilizer composition, wherein a ratio of the *E. prolifera* to the ground fenugreek seeds to the mastic gum by weight is 6:3:1.

3. The method of making a fertilizer composition as recited in claim 2, further comprising the step of casting and molding the fertilizer composition into fertilizer pellets.

\* \* \* \* \*